Sept. 20, 1971   J. C. CATLETT ET AL   3,605,339
MANUAL BALANCED DOOR
Filed May 6, 1969   7 Sheets-Sheet 1

INVENTORS
JOHN C. CATLETT,
JAMES R. GILSON
BY *Ralph W. Kalish*
ATTORNEY

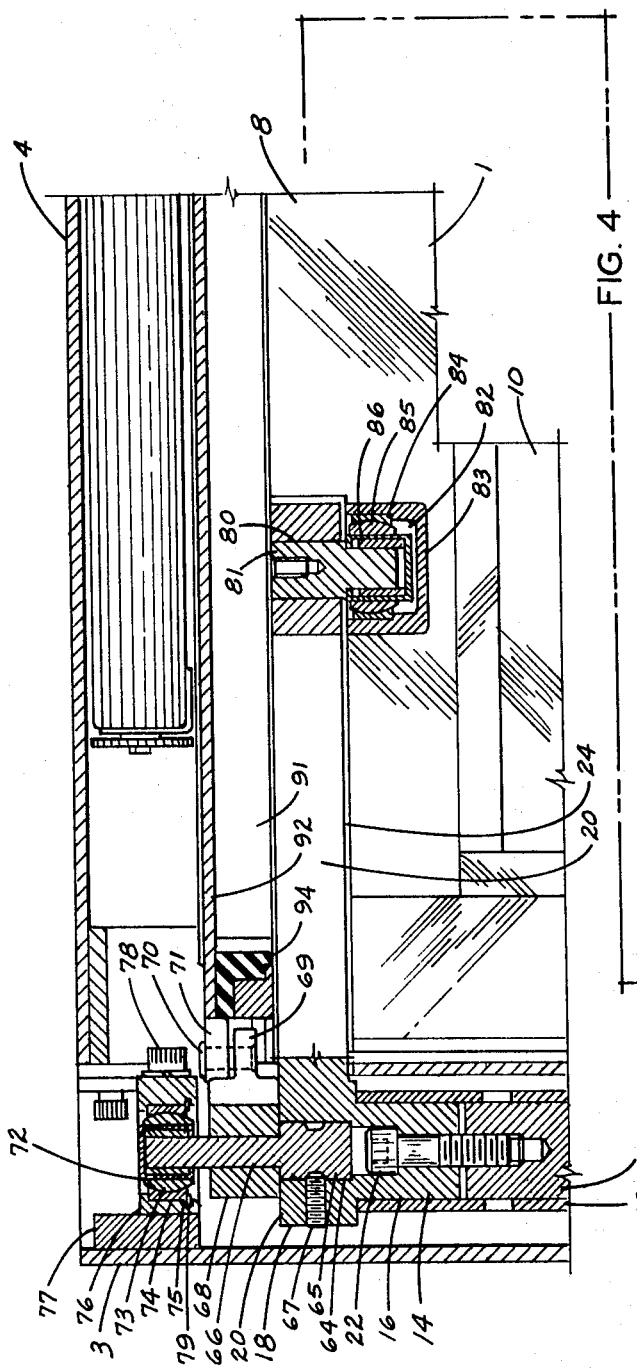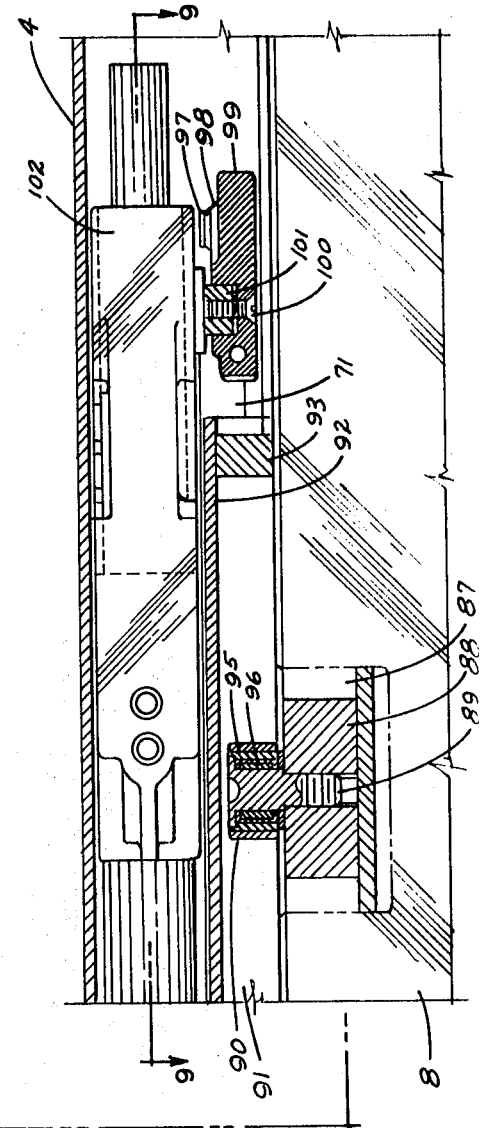

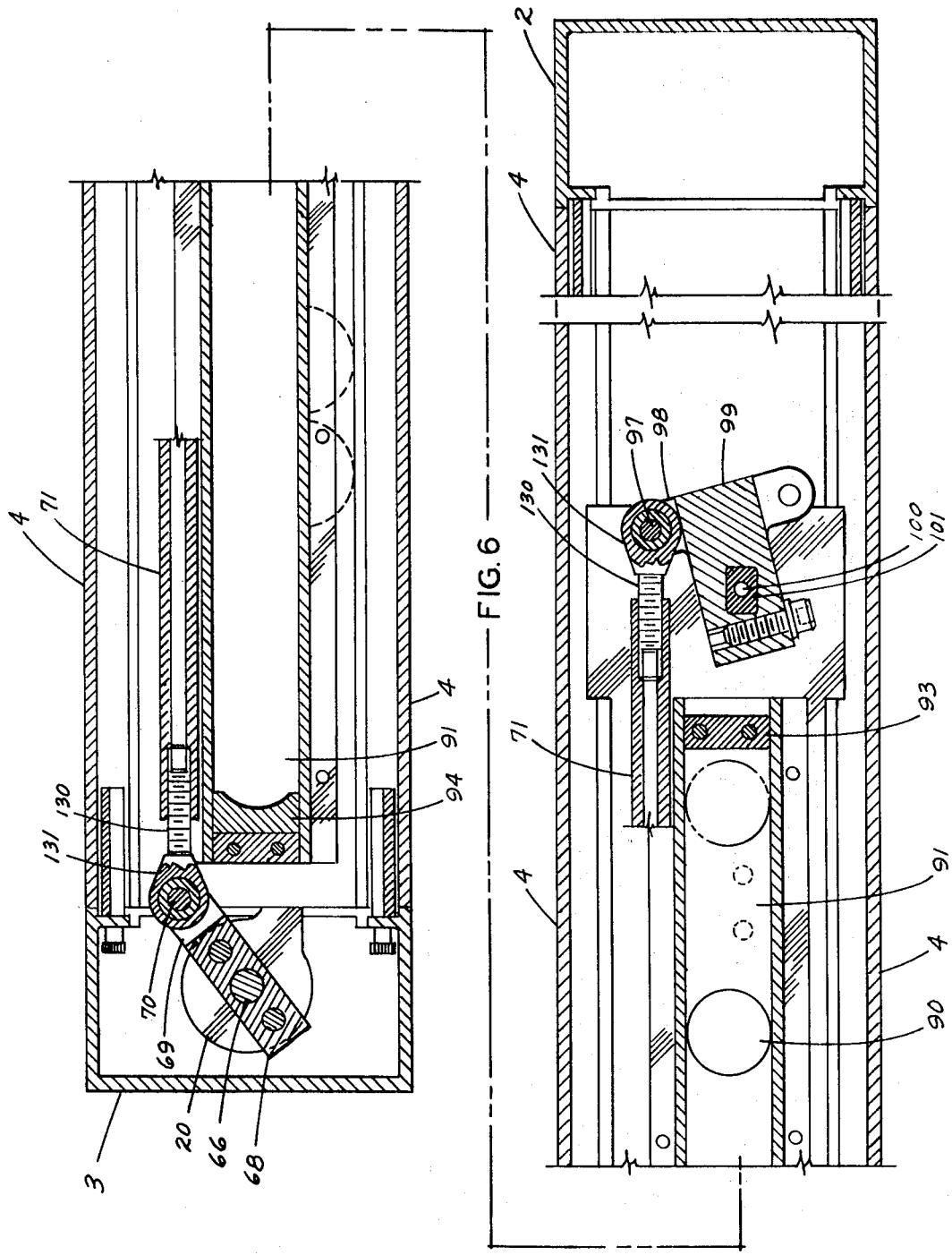

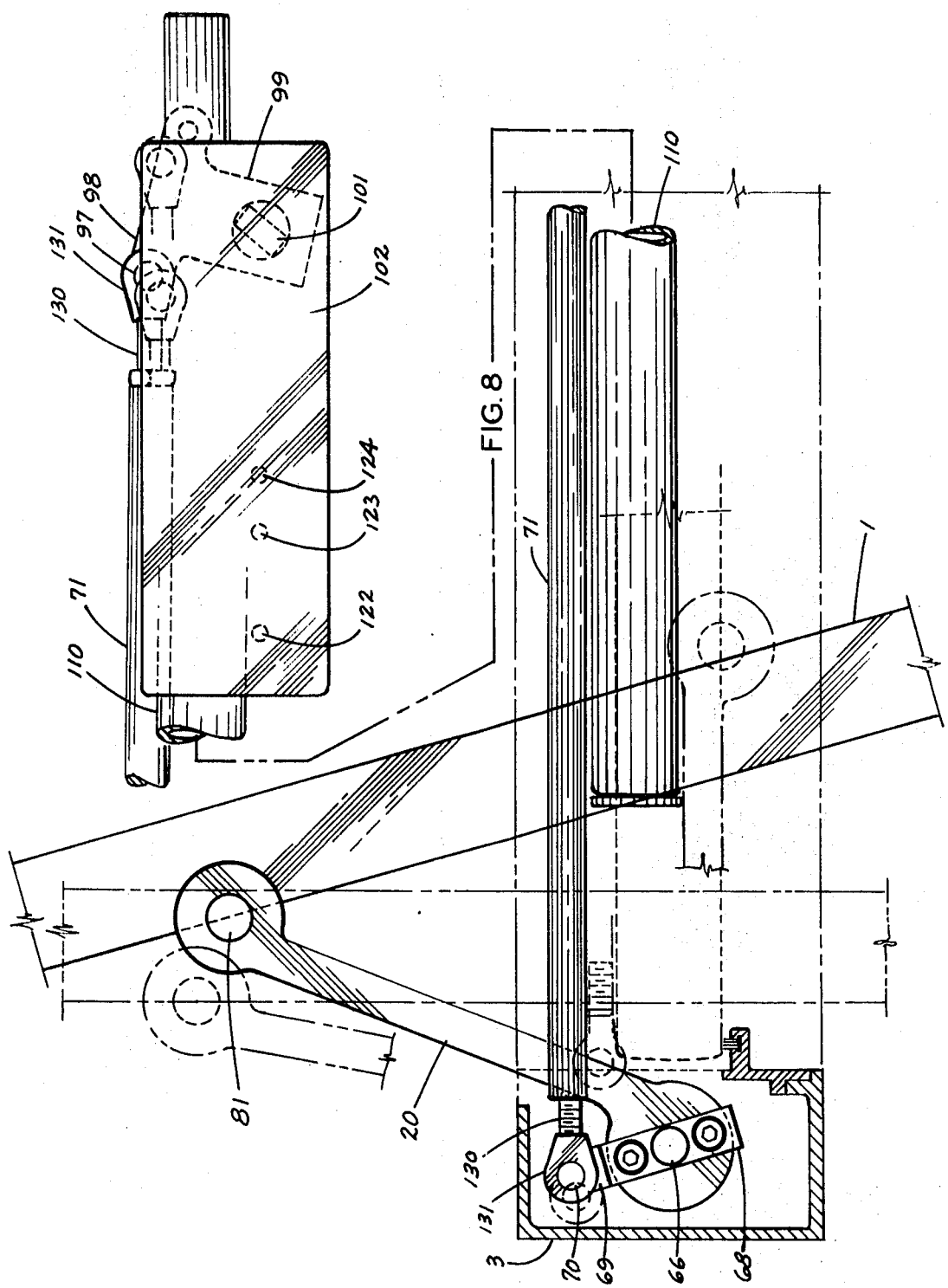

INVENTORS
JOHN C. CATLETT,
JAMES R. GILSON
BY Ralph W. Kalish
ATTORNEY

INVENTORS
JOHN C. CATLETT,
JAMES R. GILSON

BY Ralph N. Kalish

ATTORNEY

United States Patent Office 3,605,339
Patented Sept. 20, 1971

3,605,339
MANUAL BALANCED DOOR
John C. Catlett and James R. Gilson, Memphis, Tenn., assignors to Gyro Tech, Incorporated, Memphis, Tenn.
Continuation-in-part of application Ser. No. 625,246, Mar. 22, 1967. This application May 6, 1969, Ser. No. 822,254
Int. Cl. E05l *11/24, 15/02, 15/10*
U.S. Cl. 49—340
13 Claims

ABSTRACT OF THE DISCLOSURE

A manually balanced door comprising a door having a balanced hinge arrangement wherein each hinge point is provided with a unique bearing assembly comprising, in combination, thrust bearings, needle bearings and self-aligning bearings; there being a door operator adapted for actuation pursuant to manually initiated swinging of the door which operator incorporates means for controlling the speed of swing through the opening and closing arcs of movement and further embodies a resilient member for storing of energy during opening movement to effectuate closing upon release thereof.

BACKGROUND AND SUMMARY OF THE INVENTION

This invention relates in general to doors and more particularly to a balanced door adapted for manual operation. This application is a continuation-in-part of co-pending patent application Ser. No. 625,246, filed Mar. 22, 1967, now Pat. No. 3,457,674 entitled Automatic Balanced Door Operator.

It is an object of the present invention to provide a manually balanced door which is uniquely constructed so as to assure of continuous, smooth operation regardless of any heretofore misaligning-promoting forces, such as by improper installation, building settlement, contraction and expansion and the like.

It is another object of the present invention to provide a manually operated door which is adapted to obviate the development of any untoward binding action as developed in current structures through application of excessive, undistributed loads.

It is a still further object of the present invention to provide a manually operated door which incorporates a novel bearing assembly on each hinge point so as to maintain the particular hinge axis in proper, effective attitude to thereby bring about longevity in effective operation of the door.

It is a still further object of the present invention to provide a manually operated door incorporating novel, easily adjusted means for compensating for any movement of the door frames so as to inhibit the transmission of any abnormal stresses to the door.

It is another object of the present invention to provide a manually operated door which incorporates a door operator having unique means for adjustably controlling the speed of the increments of travel of the door during opening and closing so as to inhibit damaging, injury-provoking movement at the approach of fully open and fully closed states.

It is another object of the present invention to provide a door of the character stated having a door operator of relatively simple construction so as to be resistant to breakdown.

It is another object of the present invention to provide a manually operated door which is relatively inexpensively manufactured; which is so designed as to permit of ease of inspection of any operating parts thereof; and which is durable and reliable in usage.

It is a still further object of the present invention to provide a back check with a manually operated balanced door, which is novel since the same has not been heretofore utilized except with automatic balanced doors.

BRIEF DESCRIPTION OF THE DRAWINGS

FIG. 4 is a vertical transverse sectional view through the upper portion of the door and adjacent portions of the frame in the area indicated by 4 in FIG. 1.

FIG. 6 is a horizontal transverse sectional view taken on the line 6—6 of FIG. 1.

FIG. 8 is a schematic top plan view of the door illustrating the same in various positions.

DESCRIPTION OF THE PREFERRED EMBODIMENT

Figure 1:
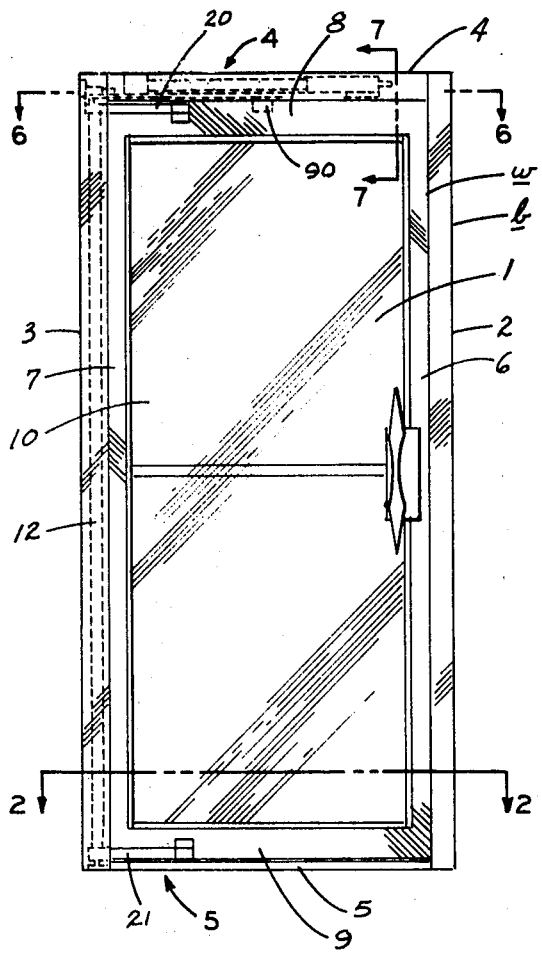
FIG. 1 is a front view of a manual balanced door constructed in accordance with and embodying the present invention.

Referring now by reference characters to the drawings which disclose the preferred embodiment of the present invention, 1 generally designates a door for disposition within a doorway *w* defined by a frame *b* comprising side jambs 2, 3, a header 4 and a base or threshold 5. Door 1 embodies vertical rails 6, 7 and upper and lower leafs 8, 9, respectively, which are preferably formed of metal and are adapted to receive the edge portions of transparent panel 10. Said rails, leafs, jambs and header are desirably produced by extrusion so as to present interior volumes.

Figure 2:
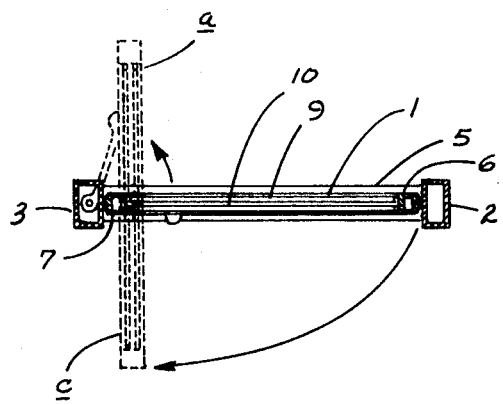
FIG. 2 is a horizontal transverse sectional view taken on the line 2—2 of FIG. 1 and indicating the path of movement of the door between open and closed conditions.
Figure 3:
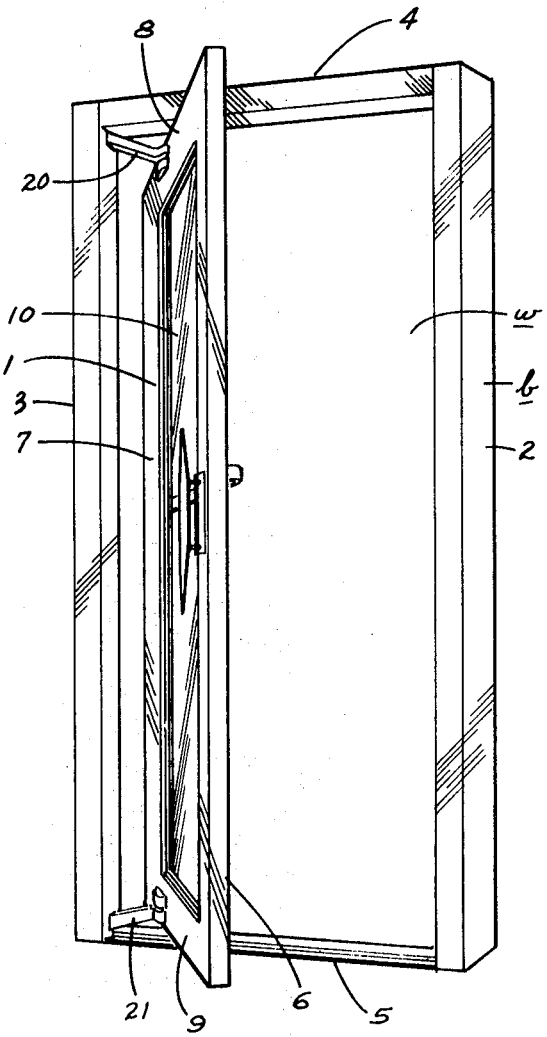
FIG. 3 is a perspective view illustrating the door in a substantially open condition.
Figure 7:
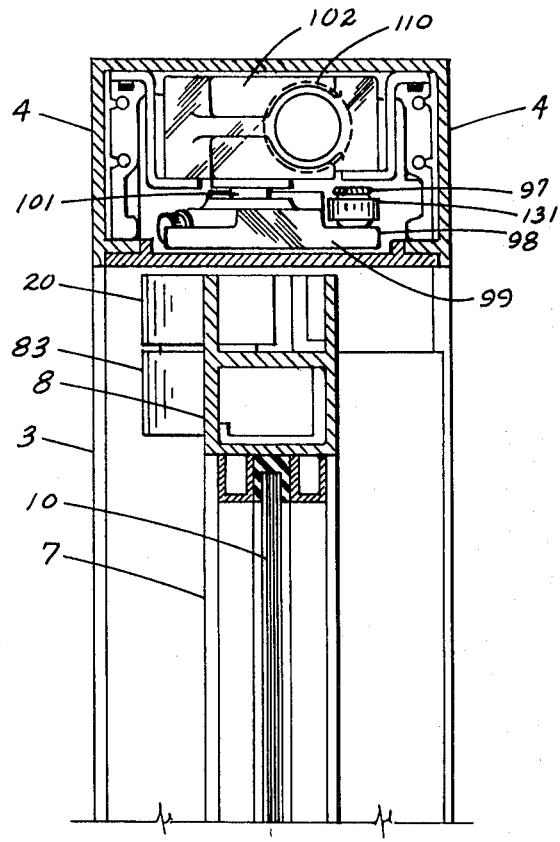
FIG. 7 is a vertical transverse sectional view taken on the line 7—7 of FIG. 1.
Figure 5:
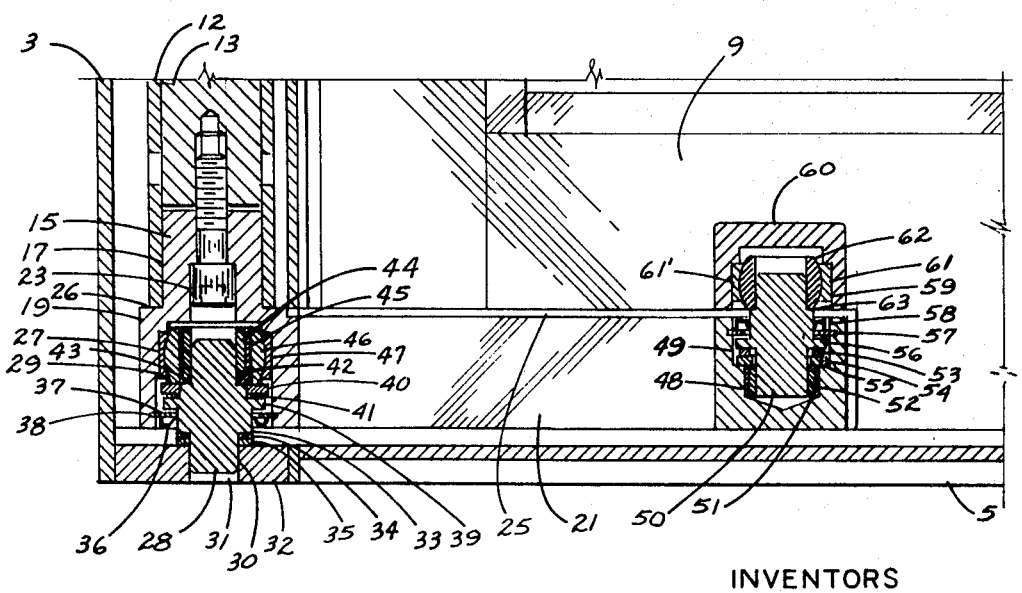
FIG. 5 is a vertical transverse sectional view taken through the lower portion of the door and adjacent portions of the frame in the area indicated by 5 in FIG. 1.

Door 1 is of the balanced type, being related to door frame *b* for swinging about an axis located inwardly of jamb 3, whereby, upon movement, a part of door 1 as indicated at *a* in FIG. 2 will swing inwardly and the other equal part, as indicated at *c*, will swing outwardly with door 1 thus being folded toward jamb 3 to present a full door opening.

Provided interiorly of jamb 3 is a hinge shaft 12 preferably of tubular form and terminating at its upper and lower ends spacedly from the upper and lower edges, respectively, of proximate door leafs 8, 9, respectively. There may be disposed interiorly of shaft 12 a head reinforcing beam 13 which terminates at its upper and lower ends from the proximate end of shaft 12 to present endwise-opening recesses 14, 15, respectively, for snugly accepting the extensions 16, 17, respectively, of hubs 18, 19, respectively, of upper and lower door pivot arms or levers 20, 21, respectively. Said beam 13 at its opposite ends is axially tapped for engaging a bolt 22, 23 for securing same to the related hub extension 16, 17, respectively, which latter is axially bored, counter-bored and tapped for engaging the related bolt 22, 23.

Each pivot arm 20, 21 is of the appropriate length for balancing of door 1 being generally of a length one quarter the transverse extent of said door 1, being receivable within an outwardly opening recess 24, 25 respectively, formed in the outer edge portion of the related door leaf 8, 9, respectively, so that when door 1 is in closed condition the side faces of pivot arms 20, 21 will be surfacewise aligned with the side faces of the related door leaf, 8, 9. Hub 19 of lower pivot arm 21 on its upper face abuts the lower margin of shaft 12, as at 26, and in its end face is provided with an upwardly opening counter-bore 27 for receiving a hinge pin 28 and bearing assembly generally indicated 29. In its lower end the hinge pin 28 diametrally relatively reduced, as at 30, for reception within an opening 31 formed in a base plate 32 located at the lower end of jamb 3. Spacedly upwardly of base plate 32 hinge pin 28 is diametrally increased to present a downwardly directed shoulder 33 between which and the upper confronting face of base plate 32 there are disposed a pair of spacer rings 34, 35, encircling the adjacent portion of hinge pin 28. Within the lower end of bore 27 there are presented surroundingly of hinge pin 28 an oil seal 36 and an overlying retaining ring 37 the peripheral portion of which is received within a groove 38 developed in the wall of counter-bore 27, and the upper face of ring 37 abuts against the underface of a circumferential extension 39 integrally formed with hinge pin 28. Seated upon the upper face of circumferential extension 39 is a roller thrust bearing 40 and an overlying radial thrust bearing 41. In its upper end portion hinge pin 28 is diametrally reduced as at 42, presenting an upwardly directed shoulder 43 against the upper face of which abuts the lower end of a needle bearing 44 within which said upper portion of hinge pin 28 is journalled. Surroundingly of said bearing 44 is a sleevelike spacer 45 engaged about the outer face of which is a self-aligning ball bushing 46; said bushing cooperating with an outer race 47 snugly engaged within the upper portion of counter bore 27. It will thus be seen that hinge pin 28 is coaxial with shaft 12 and bearing assembly 29, encompassing both. Thrust and radial bearings reliably supports hinge pin 28 for assuring self-aligning thereof with effective, smooth operation of door 1 despite the directions and intensities of thrusts or forces acting thereon during usage.

At its outer or jamb-remote end pivot arm 21 is provided with an upwardly opening bore 48 and counter-bore 49 for receiving the lower portion of a pivot pin 50 and the associated bearing assembly indicated generally 51. The lower end portion of pivot pin 50 is journalled within a needle bearing 52 which latter is received within bore 48. Immediately upwardly of needle bearing 52 and disposed encircling of pivot pin 51 is a roller thrust bearing and a radial thrust bearing 53, 54, respectively; said former abutting against shoulder 55 developed by counter-bore 49 and the latter abutting against the end face of a circumferential extention 56 formed substantially intermediate the length of pivot pin 50. Provided on said pin 50 immediately upwardly of extension 56 is a retaining ring 57 and grease seal 58; said latter being substantially aligned with the upper surface of pivot arm 21 above which the upper end of pivot pin 50 extends for projection into the downwardly opening recess 59 developed in a boss 60 carried in door leaf 9. Mounted within said recess 59 is a race 61 for receiving the outer curvate face of a ball-type, self-aligning bearing 62 suitably engaged upon the upwardly projecting end of pivot pin 50 and abutting on its lower edge on a circumferential shoulder 63 formed on pivot pin 50 spacedly from its upper extremity. As will be discussed more fully hereinbelow bearing assembly 51 together with the bearing members disposed within recess 59 coact to allow pivot pin 50 to accept both radial and vertical thrusts imposed upon door 1 during usage without causing misalignment.

Hub 18 of upper pivot arm 20 is provided with an axial bore 64 in the upper portion of which is received the relatively widened base 65 of an elongated hinge pin 66 the upper portion of which extends into the upper end, header-adjacent portion of jamb 3; said hinge pin 66 being maintained fixedly with respect to hub 18 by means of a set screw 67.

Fixed upon hinge pin 66 immediately upwardly of hub 18 is a hinge check connector 68 having a boss 69 extending radially with respect to hinge pin 66 for engagement as by a pin 70 to the inner end of a door check connecting rod 71. The upper end of hinge pin 66 above connector 68 is journalled within a needle bearing 72 about which is disposed a ball bushing 73 the outer face of which is received upon a race 74 suitably secured within a recess 75 on a top hinge bearing plate 76 mounted within jamb 3 as by a hinge plate 77 and a hinge plate screw 78. Said outer race 75 is maintained in operative position by means of a retaining ring 79. At its outer or jamb-remote end upper pivot arm 20 is provided with a bore 80 the axis of which is normal to the longitudinal axis of said arm 20, for receiving of the upper portion of a pivot pin 81 which projects downwardly into the upwardly opening recess 82 formed in a boss 83 carried in upper door leaf 8 (FIG. 4). Disposed within said recess 82 is a race 84 for receiving the outer curvate face of ball type self-aligning bearing 85 which is disposed surroundingly of a needle bearing 86 within which lower portion of said pivot pin 81 is journalled. Presented substantially centrally of upper door leaf 8 and opening upwardly to the top margin thereof is a recess 87 for a guide roller bracket 88 which is centrally bored and tapped to receive a screw 89 the upper or head of which mounts a guide roller, indicated generally 90, which is presented above door leaf 8 for reception within an elongated downwardly opening guide track or groove 91 provided in the lower portion of header 4 and being determined by a top wall-forming plate 92 and under stops or bumpers 93, 94. It will be observed that guide roller 90 is adapted for rotation by means of radial bearings 95, 96. It will thus be seen that upon swinging of door 1, guide roller 90 will travel along the linear path defined by said track 91 until the same is brought into abutment with the particular stop 93, 94 thereupon determining the extent of the door movement in such direction. Guide roller 90, together with its related components, serves as a counterbalancing force as the door swings into opening position, assuring movement of the door in a predetermined path since guide roller 90 is forced along its prescribed course of travel by reason of the constraint caused by said track 91.

At its outer end door check connecting rod 71 is engaged as by a pin 97 to a boss 98 extending to one side of a generally rectangular plate-like connector 99 being located within header 4 proximate track stop 93. By means of a screw 100 connector 99 is engaged to a door check shaft 101 located upwardly of said connector 99 and being suitably journalled within a compartment 102 provided within said header 4.

Fixed upon shaft 101 within said compartment 102 is drive gear 103 meshing with a rack 104 which latter is continuous at one end with a piston rod 105. Said rod 105 projects hrough a bore 106 formed in a partition 107 which defines jamb-proximate end of said compartment 102. The other end of bore 106 connects with a chamber 108 which is relatively diametrally increased for accommodating a piston head 109 having an outside diameter substantially equal to the inside diameter of chamber 108 for purposes presently appearing. Chamber 108 at its end remote from bore 106 is continuous with the interior of a cylinder 110 which extends toward the proximate door jamb, above plate 92, with the end of said cylinder 110, remote from chamber 108, being closed as at 111; against the inside face of which bears one end of a compression spring 112, the opposite end of which bears against the end face 113 of piston head 109.

Figure 9:
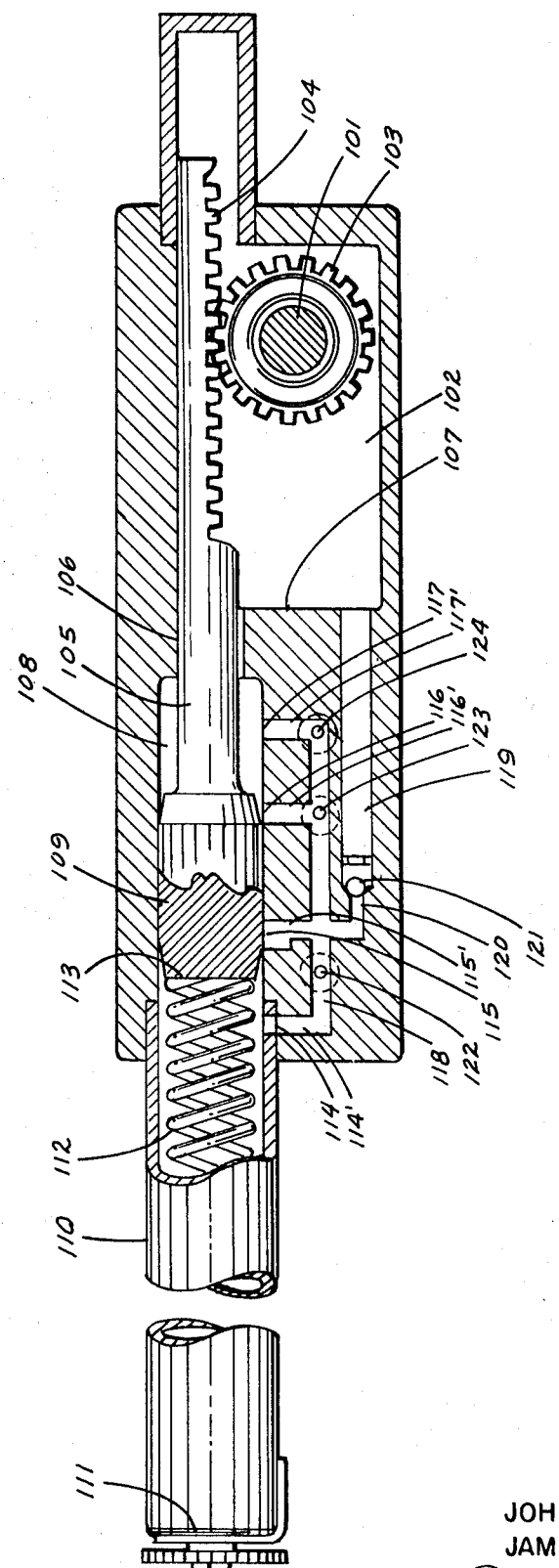
FIG. 9 is a horizontal transverse sectional view taken on the line 9—9 of FIG. 4.
Figures 10, 11:
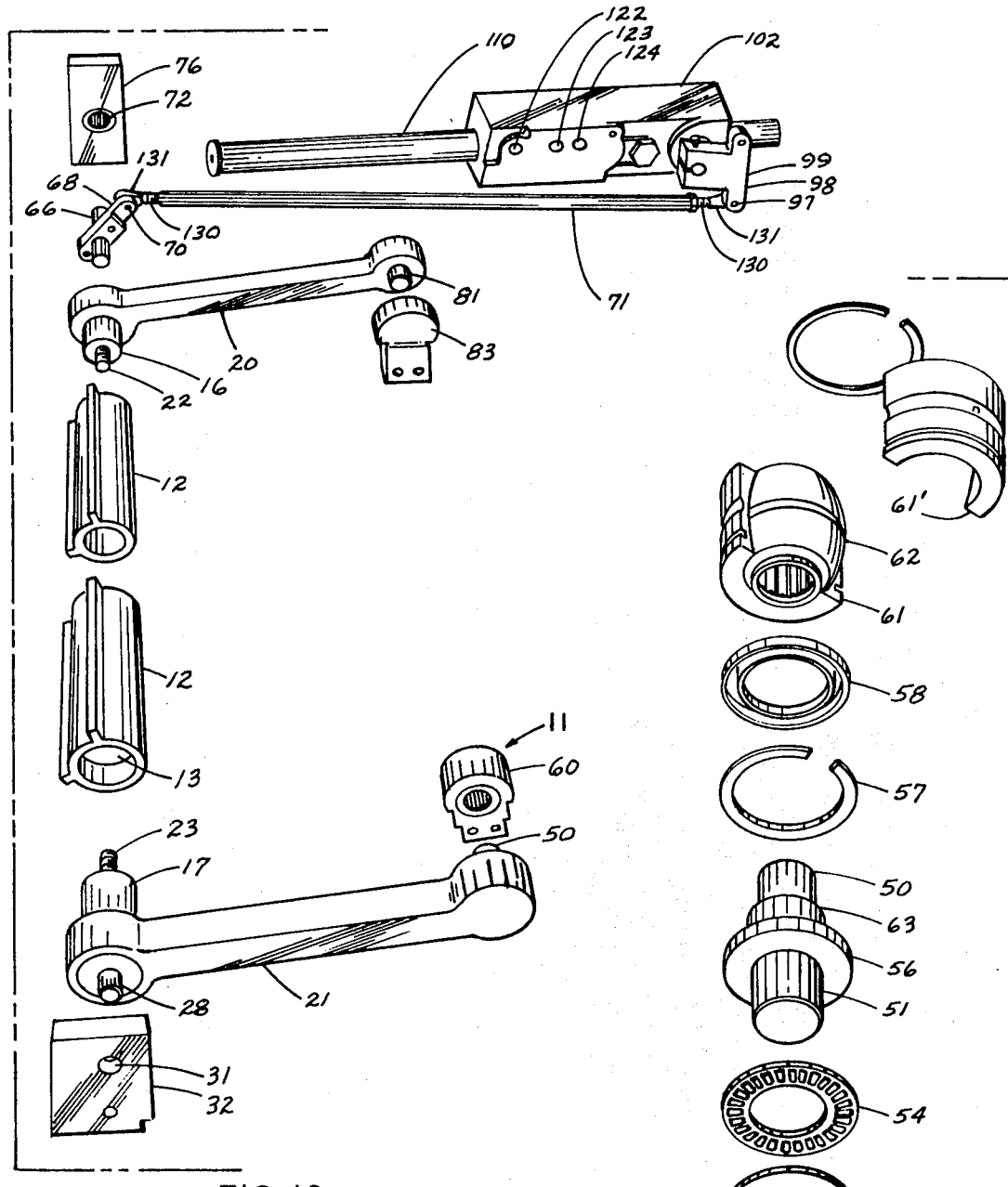
FIG. 10 is an exploded perspective view of the shaft pivot arms and closer.
FIG. 11 is an exploded perspective view of the components of the bearing assembly in the zone indicated by 11 in FIG. 10.

Opening into one side of chamber 108 is a series of spaced apart ports 114, 115, 116 and 117 which are continuous with passages 114′, 115′, 116′ and 117′; the axes of said latter being parallel at their port-remote ends. Last said mentioned passages open into common passage 118 axially normal to said passages. Common passage 118 is connected to a relatively wide, parallel duct 119 by a short conduit 120 which is axially aligned with passage 115'. Duct 119 opens at its end distant from conduit 120 into compartment 102 (FIG. 9). In usage said compartment 102 constitutes an oil reservoir, while located within said duct 119 is a check valve 121; while within common passage 118 there are located adjustors 122, 123, and 124 for controlling the flow within passages 114', 116' and 117', respectively. Said first-mentioned adjustor 122 permits control of the oil flow for regulating the speed of movement of door 1 into open position thus effectively serving as a cushining back check which by reason of the particular location of port 114 causes such back check to come into operation at a predetermined point during door opening, such as, for instance, at 70% thereof. Thus, by regulating adjustor 122 the cushioning effect is readily controlled. Similarly, adjustors 123 and 124 coact to provide a two-speed control for the door closing movement as will be described more fully hereinbelow.

In view of the foregoing it will be seen that as door 1 is manually pushed into open position, a swinging or rotative action is developed about the pivot axis created by upper and lower pivot pins 81, 50, respectively, with the related arms 20, 21, respectively, also swinging about hinge shaft 12. Roller 90, by simultaneously travelling along track 91 will control the movement of door 1 as it is thus rotated and swings into open position. The swinging of upper arm 20, through hinge pin 66 with concomitant rotation of connector 68, will cause connecting rod 71 to travel linearly in a direction laterally of door opening, as between the closed and open position indicated in FIG. 8. Such axial movement of connecting rod 71 will result in swinging of connector 99 effecting rotation of shaft 101 in a counter-clockwise direction, as viewed in FIG. 9, whereby rack 104 will be moved toward the left of FIG. 9 or in a jambwise direction. Such operation of rack 104 will bring about operation of piston head 109 for travel within chamber 108 for compressing spring 112 within its housing 110 thereby placing same under tension with the storing of energy for door closure, as will be described momentarily. As indicated above, the door opening movement is restricted by the hydraulic back check so that a damaging or jarring opening movement is inhibited. Door 1 will thus remain open as long as the user applies manual pressure thereagainst but upon release of the same, door 1 will automatically swing returningly toward closed position by release of the energy stored in spring 112. Said spring 112 will thus operate against piston head 109 to move same in direction toward partition 107 causing rack 104 to transmit motion to gear 103 with resultant linear movement of connector rod 71 into door-closed position. The unique arrangement of ports 116, 117 together with adjustors 123, 124, respectively, coordinating with check valve 121 permit of sequentially arranged closing speeds whereby adjustor 123 may allow oil flow at such rate as to permit the door closing movement until occlusion of said port by piston 109 to be relatively rapid while adjustor 124 will so restrict oil flow as to cause the movement of the door through its last increment of travel toward full closure to be relatively slow, such being nominally referred to as "latching speed" whereby a non-jarring, easy closing is developed. Although it is not critical, it has been found that the latching speed would be effective through an arc in the neighborhood of 10 degrees. Accordingly, the door operator, as above described, is most unique in that its components are adapted for operation through linear travel of connecting rod 71, pursuant to the door swinging action; and comprise a simplicity of parts which are resistant to breakdown while assuring proper speed of swing control whereby the same is proof against the customary careless, forceful actions of individuals in manipulating manually operable doors. Furthermore the door operating system is most compactly disposed in header 4 so that the same is readily accessible for inspection.

It is to be further observed that the door operator is so connected as to allow for proper compensation should there by any untoward shifting of the door frames as through improper installation, settlement and the like. Reference is thus made to the fact that connector 71 at each of its ends is engaged to pins 70, 97 at its opposite ends by means of a threaded rod 130 having spherical rod ends 131.

One of the most novel features of the present invention resides in the unique bearing assemblies which are provided at each of the four moving points in door 1, namely at pivot pins 81, 50 and at hinge pins 28, 66. It is recognized that in balanced doors known heretofore, bearings of some type have been used for reducing friction and to allow the doors to operate properly particularly in the case of heavy doors and heavy loads. However, heretofore existing balance doors have not been designed to compensate for misalignment caused by improper installation, building settlement, movement of buildings, normal expansion and contraction, and the like, which cause the bearings to bind and thereby critically impair the usefulness of the door, necessitating expensive, costly, time-consuming repair. Another customarily encountered factor in usage which has not been solved by doors of the type heretofore known has been the damage to the bearings when extensive loads are applied to but limited portions of the bearings rather than to the entire bearing arrangement. The present invention clearly overcomes this industry-recognized defect by providing an unusual combination of roller thrust bearings and regular roller bearings at each point of rotation so as to assure of maximum efficiency with minimum friction for both thrust loads resulting from the weight of the doors and the rotating loads developed by the movement and the force acting on the doors. In addition to these unique bearing combinations the pivot pins and hinge pins are so connected that the related self-aligning, or ball, bushings, as at 46, 73, and 62, 85, will permit of movement of both the door frame and the door from all the above indicated causes while continuously assuring proper aligning of the related pins, therefore, the door of the present invention is endowed with maximum life and ease of operation, regardless of encountering abnormal conditions of wear. Thus the components of the various bearing assemblies of the present invention have been developed in a most studied manner and represent a unique integration of needle bearings, thrust bearings, and self-aligning bearings for providing longevity of smooth door operation without respect to the environmental conditions and types of usage.

Doors of the present invention are subjected to severe usage as the same are customarily operated by myriad individuals each of whom applies force in a different manner and under varying states of motivation for door operation.

Another novel feature of the present invention is the provision of the back check as provided by port 114 and associated passage 114'. Referring again to FIG. 9 it will be seen that the travel of piston rod 105 into door opening position, that is in a direction toward the left hand side of FIG. 9, the last portion of its movement will be controlled by the particular adjustment of adjustor 122. Thus, by regulation of the latter the hydraulic flow through passage 114', that is in a direction ultimately toward the right hand side of FIG. 9, may be so limited as to retard the movement of piston rod 105 toward door full-open position and thus providing what is commonly known as a back check. By a reverse, or more open, adjustment of adjustor 122 the back checking operation will be markedly reduced with possible untoward damaging jarring of the door as it reaches its open limit. Thus the present invention represents the first construction representing the back check feature with manually operated doors since the same has not been considered heretofore adaptable for such purpose. Therefore, the door of the present invention provides the unique features of movement control heretofore deemed only associated with automatic doors.

Having described our invention, what we claim and desire to obtain by Letters Patent is:

1. In combination with a balanced door having a door frame comprising a header, a pair of side jambs, and a base for defining an opening; one of said jambs having a chamber; a hinge shaft disposed in said chamber; a door provided in said opening; an upper and a lower pivot arm connecting said door and said hinge shaft; the jamb remote ends of said upper and lower pivot arms being vertically aligned to establish a pivot axis; a pivot pin carried at the jamb remote end of each of said upper and lower pivot arms; said door having a recess in both its upper and lower portion for journaling therein of the pivot pin of the related pivot arm; bearing means presented surroundingly of each pivot pin for accepting both vertical and radial thrusts without causing misalignment; a door closer disposed in said header; and means operatively connecting said door closer and said hinge shaft.

2. The combination as defined in claim 1 and further characterized by said bearing means comprising thrust bearings and a self-aligning bearing.

3. The combination as defined in claim 1 and further characterized by each of said upper and lower pivot arms at their jamb remote ends having a recess, a pivot pin mounted within said recess and projecting downwardly therefrom, said door having in its upper and lower portions a recess opening toward the related pivot arm for receiving the extended portion of the associated pivot pin, a first bearing assembly provided in the recess of said lower pivot arm and comprising a needle bearing, a roller thrust bearing and a radial thrust bearing all being encirclingly disposed about the respective pivot pin, a second bearing assembly provided within each door recess and comprising a ball-type, self-aligning bearing within which the proximate portion of the associated pivot pin is received, and a race mounted within said recess for receiving the outer face of said self-aligning bearing.

4. The combination as defined in claim 1 and further characterized by each of said upper and lower pivot arms having a hub portion, means for engaging each of said hub portions to said hinge shaft, said hub portion of said lower pivot arm being bored; a hinge pin receivably within said bore; and a bearing assembly comprising a plurality of discrete bearing members provided within said bore encirclingly about said pin.

5. The combination as defined in claim 4 and further characterized by the bearing assembly provided within said hub bore comprising a roller thrust bearing, a radial thrust bearing overlying said roller thrust bearing, a needle bearing presented upwardly of said last mentioned bearing encirclingly upper portion of said pin, a self-aligning ball bushing disposed radially outwardly and circumferentially of said needle bearing, and a race surrounding said ball bushing for accepting the outer curvate face thereof.

6. The combination as defined in claim 4 and further characterized by the hub portion of said upper pivot arm having an upwardly opening bore, a hingle pin fixed at its lower end in the bore of said hub portion of said upper pivot arm and extending thereabove, a bearing assembly disposed about the upper end of said hinge pin and comprising a needle bearing, disposed about said hinge pin, a self-aligning bearing engaged about said needle bearing, and having an outer curvate face, a race receiving said self-aligning bearing and bracket means supporting said race.

7. The combination as defined in claim 1 and further characterized by said bearing means comprising a needle bearing, a roller thrust bearing, a radial thrust bearing, and a ball-type self-aligning bearing.

8. The combination as defined in claim 1 and further characterized by each of said upper and lower pivot arms at their jamb remote ends having a recess, a pivot pin mounted within said recess and projecting doorward therefrom, said door having in its upper and lower portions a recess opening toward the related pivot arm for receiving the extended portion of the associated pivot pin; a first bearing assembly provided in the recess of said lower pivot arm and comprising thrust bearings encirclingly disposed about the respective pivot pin; a second bearing assembly provided within each door recess and comprising a self-aligning bearing within which the proximate portion of the associated pivot pin is received.

9. The combination as defined in claim 1 and further characterized by said door closure comprising a compression spring; a piston having a piston head engaging said spring for stressing same during door opening movement; a rack engaged to said piston; a gear meshing with said rack; a shaft; said gear being mounted on said shaft; connecting means engaging said hinge shaft to said shaft for effecting rotatable movement of the latter upon the swinging of the former.

10. The combination as defined in claim 9 and further characterized by said connecting means comprising a connecting rod; means engaging said connecting rod at one end to said hinge shaft; and a connector fixed on said shaft and engaging said connecting rod at its other end.

11. The combination as defined in claim 9 and further characterized by a source of hydraulic fluid provided within said header; chamber defining means provided within said header for accommodating said piston head and said compression spring; fluid conduit means connecting said source of hydraulic fluid with said chamber; said chamber having a plurality of ports in communication with said fluid conduit means; and valve means provided in said fluid conduit means for effecting adjustable control of the rate of hydraulic fluid flow for determining the rate movement of said door during opening and closing thereof.

12. A combination as defined in claim 9 and further characterized by means defining a housing presented within said header; said compression spring, piston, piston head, rack, gear and shaft being disposed within said housing; and hydraulic means within said housing for effecting adjustable control of the rate of door opening and closing movement.

13. The combination as defined in claim 12 and further characterized by first and second chamber defining means provided within said housing; said first chamber accommodating said piston head and said compression spring; said hydraulic means comprising hydraulic fluid provided within said second chamber; fluid conduit means connecting said second chamber with said first chamber; said first chamber having a plurality of ports in communication with said fluid conduit means; and valve means provided in said fluid conduit means for effecting adjustable control of the rate of hydraulic fluid flow from said second chamber to said first chamber for determining the rate of door movement during opening and closing thereof.

References Cited

UNITED STATES PATENTS

| | | | |
|---|---|---|---|
| 2,207,365 | 7/1940 | Williams | 49—246X |
| 2,637,877 | 5/1953 | Hanssen | 49—386X |
| 3,210,065 | 10/1965 | Linder et al. | 49—334X |
| 3,247,617 | 4/1966 | Catlett | 49—107 |
| 3,425,161 | 2/1969 | Catlett et al. | 49—340X |
| 3,457,674 | 7/1969 | Catlett et al. | 49—340 |

J. KARL BELL, Primary Examiner

US. Cl. X.R.

49—253, 260, 264, 358